United States Patent [19]

Van Cauter et al.

[11] 4,330,318
[45] May 18, 1982

[54] PROCESS FOR COATING GLASS

[75] Inventors: Albert Van Cauter, Charleroi; Robert Terneu, Thiméon, both of Belgium

[73] Assignee: BFG Glassgroup, Paris, France

[21] Appl. No.: 228,233

[22] Filed: Jan. 26, 1981

[30] Foreign Application Priority Data

Jan. 31, 1980 [GB] United Kingdom ............... 8003359

[51] Int. Cl.³ .................... C03C 17/10; C03C 17/25
[52] U.S. Cl. ............................. 65/60 C; 65/60 D; 427/110; 427/160; 427/168
[58] Field of Search ............... 427/110, 160, 168; 65/60.4, 60.5, 60.51, 60.52

[56] References Cited

FOREIGN PATENT DOCUMENTS 1516032 6/1978 United Kingdom .
1523991 9/1978 United Kingdom .

Primary Examiner—James R. Hoffman
Attorney, Agent, or Firm—Spencer & Kaye

[57] ABSTRACT

In the formation of a metal or metal compound coating on a face of a heated glass substrate during its forward displacement through a coating station by contacting the substrate with at least one stream of droplets comprising a substance or substances from which said coating is formed there is a problem in achieving coatings of high uniform quality.

In order to help meet this problem, the droplet stream(s) 23 from spray gun(s) 20 is or are inclined downwardly and forwardly (6) or downwardly and rearwardly towards the substrate 4 and at least one jet of gas is discharged (from nozzle 22) into the environment above the substrate so that it travels in the same (forward or rearward) direction above the substrate 4 and impinges against such droplet stream(s) 23.

25 Claims, 5 Drawing Figures

PROCESS FOR COATING GLASS

BACKGROUND OF THE INVENTION

This invention relates to a process for forming a metal or metal compound coating on a face of a heated glass substrate during its displacement in a given direction through a coating station by contacting the substrate with at least one stream of droplets comprising a substance or substances from which said coating metal or metal compound is formed on said face. The invention also relates to apparatus for use in carrying out such a process.

Processes of the above kind are employed for forming coatings which modify the apparent colour of the glass and/or which have some other required properties in respect of incident radiation, for example an infrared-reflecting property.

Problems are encountered in forming coatings which have uniform properties. This is partly due to the difficulty of ensuring uniformity of the structure and thickness of the coating from one zone to another.

In United Kingdom Pat. No. 1 516 032 a process of the kind referred to is described wherein the formation of an homogeneous coating is promoted by discharging the coating material against the substrate as a stream which is inclined downwardly towards the substrate, in the direction of its conveyance, so that the acute or mean angle of incidence of such stream on the substrate, measured in a plane normal to the substrate and parallel with its direction of conveyance, is not more than 60°.

United Kingdom Pat. No. 1 523 991 discloses a glass coating process of the same kind in which, for the same purpose of promoting the homogeneity and uniformity of the coating, suction forces are created in exhaust ducting situated so as to cause gases environmental to the droplet stream to flow away from said stream and into such ducting, substantially without affecting the paths of the droplets towards the substrate.

Even when observing the conditions proposed in the said prior patents, defects have sometime occurred below or at the surface of the coating which defects although often not very prominent, nevertheless disqualify the product from the top quality ratings which are now in demand. If the defects are at the surface of the coating, the quality of the product can in some but not all cases be improved by an after-coating surfacting treatment, but of course such additional treatments add to the product cost.

The residual defects are often not very marked but they may nevertheless disqualify the product from the top quality ratings which are now in demand. Taking into account the numerous factors which can influence coating quality and which can differ from one process to another, according to circumstances, it is not expected that any given quality control measure will be wholly satisfactory in all cases. But the present invention provides a control measure which has been found to be beneficial at least for reducing the incidence of the said coating defects.

SUMMARY OF THE INVENTION

According to the present invention, a process for forming a metal or metal compound coating on a face of a heated glass substrate during its displacement in a given direction (hereafter called "forwardly") through a coating station by contacting the substrate with at least one stream of droplets comprising a substance or substances, from which said coating metal or metal compound is formed on said face is characterised in that said stream(s) is or are inclined downwardly and forwardly or downwardly and rearwardly towards the substrate and in that at least one jet of gas is discharged into the environment above the substrate so that such jet travels in the same (forward or rearward) direction above the substrate and impinges against such droplet stream(s).

Experiments indicate that the process according to the invention is less liable to form coatings giving rise to light diffusion in particular at the coating surface or at the interfacial zone between the coating and the substrate. While we do not wish to be bound by any theory it is thought that certain coating faults occurring in prior art processes and causing light diffusion may have resulted from entrainment of substances towards the substrate from within the environment immediately to the rear of the downwardly inclined stream of droplets (the rear of the stream being where the droplets have the shorter trajectories). If this is correct, the improvement which has been found when using a process according to the invention may be due to interception of at least a part of the spurious compounds so entrained, and/or to a reduction in the concentration of such compounds in such induced gas flow. However the coating quality achieved in processes of the kind with which the invention is concerned is susceptible to many and subtle influences and there may be some other explanation for the beneficial effect of the said gas jet(s).

In preferred embodiments of the invention the droplet steam(s) is or are inclined downwardly and forwardly towards the substrate. In such circumstances the quality control measure according to the invention is able to avoid or reduce the occurrence of defects at the coating/glass interface or at the interface of the coating and a previously formed coating if such is present. Such below-surface defects tend to be particularly troublesome. They can in no circumstances be removed by an after-treatment.

The droplets can be discharged in a plurality of streams distributed across the path of the substrate. Such streams can together impinge on the substrate over the full substrate width to be coated. In this case the sources of the streams can be stationary and the jet or jets of gas can be discharged from a stationary orifice or from stationary orifices extending or distributed across the substrate path so that such jet(s) impinge against the droplet streams over their combined width.

However in preferred embodiments, at least one said stream of droplets impinges on a zone within the substrate face area to be coated and such stream is repeatedly displaced transversely across the path of the substrate so that the latter is, as it were, scanned by the stream of droplets. Good quality coatings can be more easily formed in this way. In some embodiments the spray head or spray heads from which the droplets are discharged is or are displaced along an endless course so as repeatedly to traverse the substrate path in one direction at the coating station. In other embodiments the spray head(s) is or are displaced to and fro transversely across the substrate path. The former procedure is conducive to smooth operation of the spray head displacing mechanism but in some circumstances a reciprocating mechanism can be more convenient to instal. The invention includes processes wherein the gas jet(s) is or are discharged from an orifice or orifices which is or are displaced transversely across the path of the substrate simultaneously with the droplet stream(s). Such processes can be very efficient in relation to the volume rate of gas discharged to form the said gas jet(s). In other processes according to the invention, the gas jet(s) is or are discharged from a stationary orifice or from stationary orifices extending or distributed transversely across the path of the substrate. In such processes the droplet stream(s) can but need not be displaced transversely across the substrate path.

For convenience in the following description reference will be made to a droplet stream and to a gas jet (singular) but in any given process two or more such streams, and/or two or more such jets, for example in side by side relation, and can be used.

Preferably the gas jet is formed by gas which is blown into the environment above the substrate from an extraneous source. The results obtained when working in that manner are generally superior to those which can be achieved by deriving the gas from the environment upstream or downstream of the coating station by means of a fan or like device installed in the said environment. The choice of the gas for forming the jet will be made having regard to the composition of the droplets and the composition of the coating to be formed on the substrate so that such gas does not itself give rise to any undesirable chemical reactions.

Preferably air is used for the gas jet. The choice of air has the merit of combining effectiveness with low cost. However other gases can be used, e.g. an inert gas such as nitrogen.

It is appropriate for the jet to be composed of gas at ordinary temperature in view of the small volume of gas which is required.

The volume flow rate of gas forming the jet and the spatial extent of its flow path cross-section, particularly in the direction transverse to the path of the substrate, are factors of importance for the objective of reducing causes of light diffusion. It is also important for the yield of the coating process, by which is meant the amount of the required coating material deposited on the glass for a given amount of material forming the droplet stream. The blowing of a jet of gas agnist the droplet stream tends to lower the yield to an extent which increases with the volume flow rate of the gas forming the jet. That rate should therefore preferably be no greater than that which gives the best results in terms of coating quality.

The most suitable volume flow rates for the jet depend upon operating conditions in individual plants and can in any given plant be determined by tests. Preferably the said volume flow rate is such that the jet slightly deforms the cross-section of the droplet stream. If this slight deformation occurs that is an indication that the strength of the jet is at least sufficient for the purpose in view. In all cases however the strength of the jet must not be such as to disrupt the droplet stream or make it unsteady. In practice most if not all of the gas forming the jet flows around the sides of the droplet stream and passes downstream.

The spatial extent of the gas jet cross-section and the volume flow rate of such jet are factors influencing the effect of the gas jet on the temperature conditions in the environment above the heated glass substrate. However, as already indicated the volume flow rate of the gas forming the jet can be small and if the gas jet is distributed over an appreciable area such thermal effect can be negligible.

The width of the jet, i.e. its spatial extent in the direction transversely of the path of the substrate, is preferably at least sufficient to ensure impingement of the jet against the full width of the droplet stream. The jet will in such circumstances intercept any current of environmental gas which may be entrained downwardly behind the droplet stream from its source.

Preferably the gas jet is of elongate cross-section, its longer cross-sectional dimension being in the direction transverse to the path of the substrate. This form of gas jet is preferred because it is conducive to efficiency in the sense that a given improvement of the coating quality can be obtained for a relatively small volume flow rate of the gas forming the jet. Good results in terms of an improvement in coating quality can nevertheless be achieved with jets of other forms, e.g. jets of circular or elliptical cross-section. It is advantageous for the jet laterally to diverge from its discharge orifice, e.g. at an included angle of 70° to 110°.

The gas jet is preferably directed so as to act against the bottom part of the droplet stream, adjacent to the glass substrate. The jet is in these circumstances more effective than if it were directed against the droplet stream near to its source.

In preferred embodiments of the invention the gas jet is inclined downwardly from its discharge orifice. This inclination is helpful in enabling the jet to have the desired effect without disturbing the steadiness of the droplet stream.

Preferably the gas jet is directed so that it is deflected against the lower portion of the droplet stream from the glass substrate. This deflection can promote distribution of the gas across the width of the droplet stream from a jet of relatively small width.

Preferably the droplet stream is inclined so that the included angle between the axis of the droplet stream and the substrate face being coated is in the range 20° to 60° and most preferably in the range 25° to 35°. This feature facilitates the formation of coatings of good optical quality. For obtaining the best results all parts of the droplet stream should be incident upon the substrate at a substantial inclination to the vertical. Accordingly, in the most preferred embodiments of the invention the droplet stream is a parallel stream or is one which diverges from its source at an angle of not more than 30°, e.g. an angle of about 20°.

Experiments indicate that uniform coatings can be more easily formed if certain conditions are observed with respect to the perpendicular distance between the substrate face being coated and the source of the droplet stream. Preferably such distance, measured normally to the substrate face, is from 15 to 35 cm. This has been found to be the most suitable range, particularly when observing the preferred inclination and divergency ranges for the droplet stream above referred to.

The invention is very suitable for use in coating a continuous longitudinally moving glass ribbon. It can also be used for coating individual glass sheets.

The invention includes processes wherein the substrate is a continuous ribbon of flat glass travelling from a flat glass forming plant, e.g. a float tank. In certain such applications of the invention, the droplet stream impinges on the top face of the ribbon of glass at a position where the temperature of the glass is within the range of 650° C. to 100° C.

The process according to the invention can be applied for forming various oxide coatings by employing a liquid composition containing a metal salt. The gas jet prevents or reduces the occurrence of coating defects which may occur when using solutions giving off reactive vapours which would otherwise be liable to be entrained into contact with the glass, behind the sprayed solution. Very advantageous processes according to the invention include processes wherein the droplets are droplets of a solution of a metal salt, a very good example being metal chloride, from which a metal oxide coating forms on the substrate. In some such processes the said solution is a tin chloride solution, e.g. an aqueous or non-aqueous medium containing stannic chloride and a doping agent, e.g. a substance providing ions of antimony, arsenic or fluorine. The metal salt can be employed together with a reducing agent, e.g. phenyl hydrazine, formaldehyde, alcohols and non-carbonaceous reducing agents such as hydroxylamine, and hydrogen. Other tin salts may be used in place of or in addition to stannic chloride, e.g., stannous oxalate or stannous bromide. Examples of other metal oxide coatings which can be formed in a similar manner include oxides of cadmium, magnesium and tungsten. For forming such coatings the coating composition can likewise be prepared by forming an aqueous or organic solution of a compound of the metal and a reducing agent. Solutions of nitrates can be employed, for example iron and indium nitrates, for forming coatings of the corresponding metal oxides. As further examples the invention can be employed for forming coatings by pyrolysis of organometallic compounds, e.g. carbonyls and metal acetylacetonates supplied in droplet form to the substrate face to be coated. Also certain metal acetates and alkylates can be used, for example tin dibutyl diacetate and titanium isopropylate. It is within the scope of the invention to apply a composition containing salts of different metals so as to form a metal coating containing a mixture of oxides of different metals.

In some processes according to the invention, a gas exhaust system is operated for drawing environmental gases away from the droplet stream in the same direction over the substrate as that in which the gas jet is directed. For this purpose suction forces can be created in one or more exhaust ducts whose gas entrance(s) is or are located facing the front of the droplet stream. Such an exhaust system can reduce risks of spurious surface deposits on the coating in the event that the droplet stream is directed downwardly and forwardly towards the substrate. The suction forces are of course controlled so that they do not disrupt the droplet stream or render it unsteady. Such processes combine performance of the present invention and the invention which is the subject of the aforesaid United Kingdom Pat. No. 1 523 991 and they may also embody the invention described and claimed in a co-pending Patent Application Ser. No. 228,234 entitled "Process and apparatus for coating glass", filed on the same date as this application and claiming priority from United Kingdom Patent Application No. 80 03 358.

The invention includes apparatus suitable for use in forming a metal or metal compound coating on a face of a heated glass substrate by a process according to the invention as hereinbefore defined. Apparatus according to the present invention comprises a substrate support and means for conveying a substrate in a given (hereafter called "forward") direction while it is thus supported, and spraying means for discharging at least one stream of droplets onto the supported substrate and is characterised in that said spraying means is constructed and arranged to discharge at least one said stream of droplets at a downward and foward or a downward and rearward inclination onto the supported substrate and in that the apparatus includes blowing means for discharging at least one jet of gas into the environment above the substrate so that such jet travels in the same (forward or rearward) direction above the substrate and impinges against said droplet stream(s).

Apparatus according to the invention may include any additional feature or features which may be required for making use of any one or more of the various optional process features hereinbefore described.

Preferably the said spraying means is constructed and arranged to discharge the droplet stream(s) downwardly and forwardly onto the supported substrate.

In certain apparatus according to the invention the spraying means is associated with a driving mechanism for repeatedly displacing said droplet stream(s) unidirectionally or to and fro transversely across the path along which the substrate is conveyed.

Advantageously, the coating apparatus is mounted in a tunnel through which the glass substrate is conveyed and the means for discharging said gas jet(s) derives the gas from externally of said tunnel.

Preference is given to apparatus wherein the spraying means is arranged for discharging said droplet stream(s) at an angle such that the included angle between the axis or axes of the droplet stream(s) and the substrate supporting plane of said support is in the range 20° to 60°, the most preferred range being 25° to 35°. Preferably the spraying means is constructed to discharge a said droplet stream or streams which or each of which is a parallel stream or is one which diverges from its source at an angle of not more than 30°, as hereinbefore referred to.

The invention includes apparatus as above defined, installed in association with a flat glass forming plant, for example a float tank, for coating a ribbon of glass as it travels from such plant. Preferably the spraying means is arranged so that the droplet stream(s) impinge(s) on the top face of the ribbon at a zone where the temperature of the glass is within the range 650° C. to 100° C.

In some apparatus according to the invention there is gas exhaust means arranged for drawing environmental gases away from the droplet stream(s) in the same (forward or rearward) direction above the substrate as that in which said gas discharge means discharges said gas jet(s).

BRIEF DESCRIPTION OF THE DRAWING

Reference is now made to the accompanying diagrammatic drawings in which.

DESCRIPTION OF THE PREFERRED EMBODIMENTS

Figure 1:
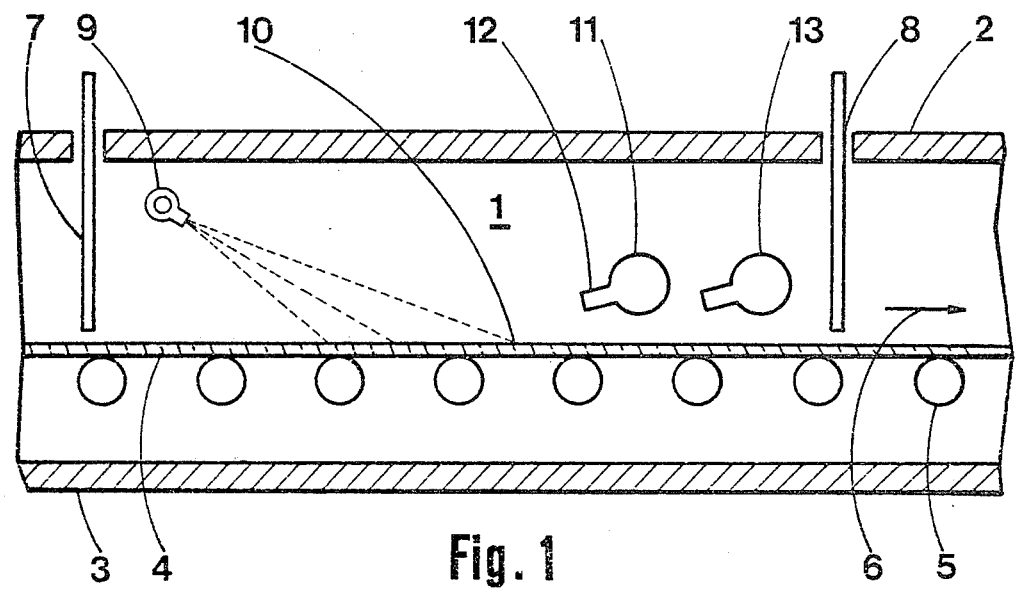
FIG. 1 is a cross-sectional side elevation of part of a flat glass manufacturing plant incorporating a previously known glass coating apparatus.

Referring to FIG. 1, the coating apparatus is located in an annealing chamber 1, having a roof wall 2 and a sole wall 3, through which chamber the glass ribbon 4 is conveyed from a ribbon forming section of the plant. The chamber 1 may for example be part of the annealing lehr of a Libbey-Owens type sheet of glass drawing machine, or it may be associated with a float tank in which the glass ribbon is formed by the float process.

The glass ribbon 4 is supported by rollers 5 and travels through chamber 1 in the direction indicated by arrow 6. Above the path of the glass ribbon the chamber 1 is provided with displaceable refractory screens 7 and 8 which define between them a compartment in which the metal compound coating is formed on the upper face of the glass ribbon as it travels through the chamber.

A spray gun 9 is mounted above the horizontal path of the glass ribbon and is connected to mechanism (not shown) for displacing such gun to and fro along a horizontal path normal to the direction of the ribbon displacement. The vertical distance between the spray gun and the top of the glass ribbon is from 15 to 35 cm. The spray gun is orientated so that droplets are discharged in a stable conical spray whose mean angle of inclination to the ribbon is from 20° to 60°, the cone angle being 20°. The general direction of discharge of the droplets from the spray gun being from left to right in the aspect of the figure, the left to right direction is the forward or downstream direction within the meaning of this specification.

At a distance of the order of 10 to 30 cm downstream from the downstream boundary 10 of the zone of impingement of the droplet stream on the glass ribbon, there is an exhaust duct 11 which is connected to means (not shown) for maintaining suction forces in the duct. The duct extends transversely across the ribbon path and has a nozzle 12 defining a slot-like gas inlet passage. The entry orifice of the nozzle is at a height of from 1 cm to 20 cm above the glass ribbon.

The suction forces which are created in duct 11 when the apparatus is in use cause gases in the environment of the droplet stream to flow continuously forwardly away from said stream and from the vicinity of the impingement zone and directly into such duct. The object of this exhaust system is to remove harmful reaction products from the atmosphere above the successively coated zones across the ribbon. The suction forces which serve to aspirate gases into the duct are adjusted so that the paths of the droplets from the spray gun to the glass ribbon are substantially unaffected by the suction forces and the process is therefore in accordance with Unted Kingdom Pat. No. 1 523 991 hereinbefore referred to. The exertion of such suction forces reduces the risk of spurious surface deposits on the formed coating, as hereinbefore referred to.

In the particular illustrated embodiment of apparatus, a second exhaust duct 13 is provided which is spaced downstream from the duct 11. The second exhaust duct draws off gases which flow downstream past duct 11.

Figure 2:
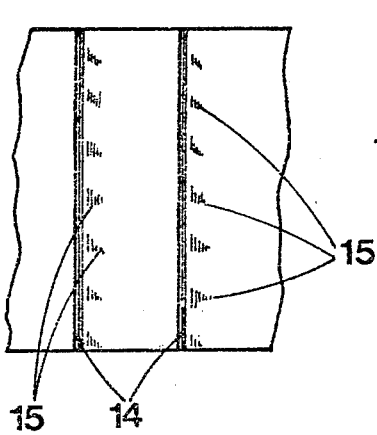
FIG. 2 is a representation in plan of certain coating defects which sometimes occur when using that apparatus.

When using apparatus as shown in FIG. 1 the glass on which the coating has been formed has occasionally been found on examination to possess coating defects which are manifest as local light-diffusing areas. Such areas are distributed over the area of the sheet glass in a recognisable pattern of which a typical example is illustrated in FIG. 2. In this figure part of a glass sheet 14 is shown in plan. The areas coloured black are the areas of the sheet in which it caused objectionable diffusion of transmitted light. Considered patternwise, these areas comprise spaced transverse bands 14 from one side of each of which there is a series of short trails 15. The light diffusing effects of the glass in these areas is small, for example from 0.2 to 0.5% greater than that of the other areas of the sheet, but the presence of these defects is not acceptable where the coating has to satisfy high class optical specifications.

The spacing of the transverse bands 14 has been found to correspond with the stepwise advancement of the droplet stream from one traversal across the glass to another. The clean edges of the bands 14 are on the forward side of those bands and the trails 15 trail from those bands in the rearward direction. It is for these reasons that the defects have been supposed to originate from the action of entrained vapours on the glass at the rear of the droplet stream.

Figure 4:
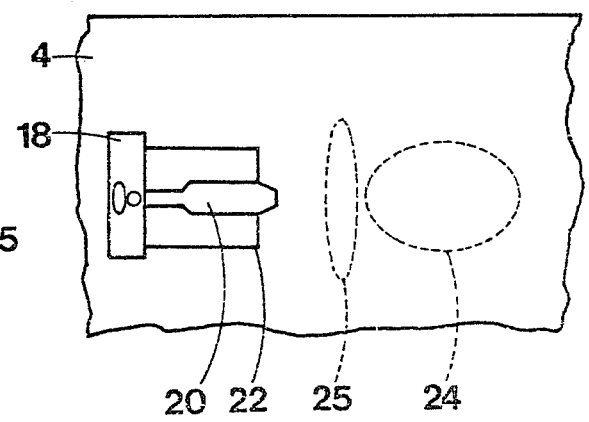
FIG. 4 is a plan view of a detail of the coating apparatus shown in FIG. 3 and of part of a glass sheet.
Figure 3:
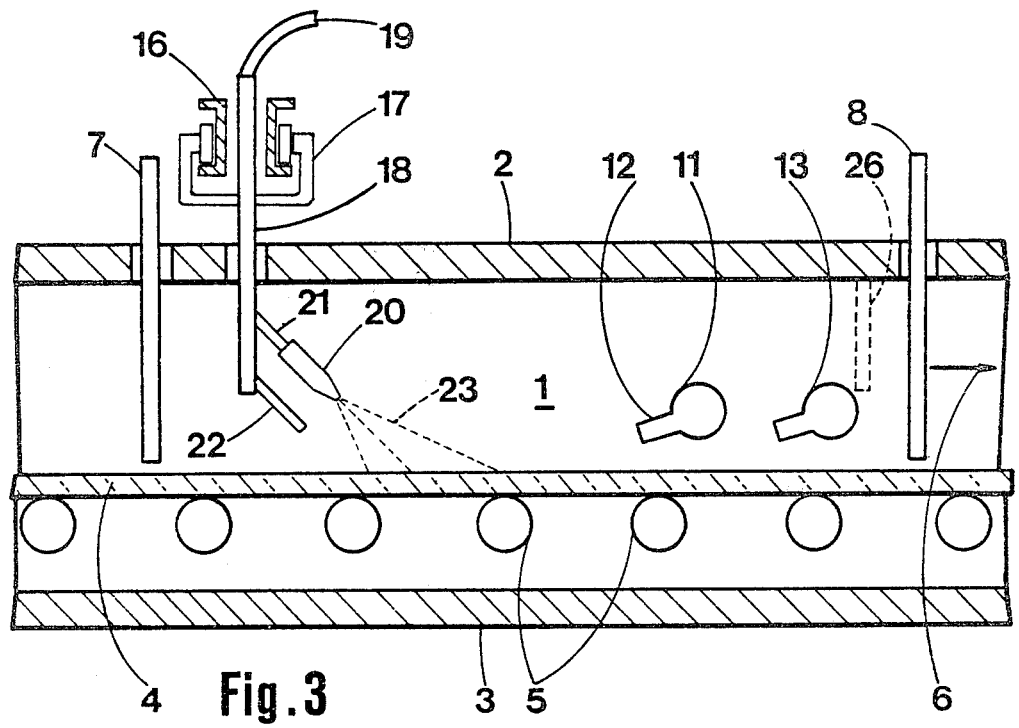
FIG. 3 is a cross-sectional side elevation of part of a plant, similar to FIG. 1, but incorporating a coating apparatus according to the invention.

FIGS. 3 and 4 show a plant similar to that shown in FIG. 1 but incorporating a coating apparatus according to the present invention, by-means of which coating defects of the kind represented in FIG. 2 can be avoided or made less liable to occur. In the plant according to FIGS. 3 and 4, in which the same numerals as in FIG. 1 are used to denote the same parts of the apparatus, there is a fixed transverse guide 16 along which a carriage 17 is mounted. The carriage has rollers which run along flanges of the said guide. The carriage supports a vertical tube 18 within which there are conduits for compressed air and solution to be sprayed. The air and solution are fed via flexible conduits, one of which, designated 19, appears in FIG. 3. Separate streams of air and solution are fed to a spray gun 20 via a branch 21 from the tube 18. A further stream of air flows further downwardly along the interior of tube 18 and issues as a jet from a flat nozzle 22 having a slot-like discharge orifice.

During the traversals of the carriage 17 across the path of the glass ribbon 4 the coating solution dicharges from the spray gun 20 as a steady conical spray cone 23 whose zone of impingement on the glass ribbon at a given instant is depicted in FIG. 4 by a broken boundary line 24. At the same time air is continuously discharged from nozzle 22 as a jet of transversely elongate cross-section whose impingement zone on the glass ribbon is represented by the dotted line 25. The gas jet is deflected forwardly by the glass ribbon against the spray cone 23 at a bottom region thereof and causes a slight flattening of the droplet stream at its rear boundary. The said flat jet diverges laterally from its source at an included angle of between 70° and 110°. The gas of such jet wholly or mainly flows forwardly past the droplet stream, on either side thereof. The very slightly deformed droplet stream remains quite steady during its traversals across the glass ribbon.

The said gas jet can intercept vapour currents which may be entrained downwardly behind the droplet stream, so preventing such vapour from flowing into contact with the glass, or diluting such vapour before it reaches the glass. The generation of such a rear gas jet during the spraying of the coating solution has been found to obviate or reduce the occurrence of defects as depicted in FIG. 2.

The overall quality of the formed coating can sometimes be improved by providing a baffle or barrier 26 above the exhaust duct 13, as represented in broken line in FIG. 3, in order to prevent any exhaust gases which may by-pass such duct from flowing over that duct and back upstream towards the coating zone. Processes and apparatus employing one or more baffles or barriers for such purpose are described and claimed in the co-pending Patent Application Ser. No. 228,234 claiming priority from United Kingdom Patent Application No. 80 03 358 above referred to.

Coating apparatus as shown in FIGS. 3 and 4 can also be used in accordance with the invention for coating a glass substrate during its displacement through a tunnel 1 in the reverse direction from arrow 6. In this case the direction of spray cone 23 towards the substrate is downwardly and rearwardly within the meaning of this specification. In these circumstances the jet of gas from nozzle 22 can intercept or dilute vapour currents which may be entrained downwardly into contact with the coating emerging from the impingement zone of the spray cone on the glass ribbon. The said gas jet can therefore prevent or reduce the incidence of defects at the coating surface, which defects might not be removable, or might be removable only with difficulty, by a subsequent surfacing treatment. If a further coating station is provided further downstream in the direction of travel of the substrate, at which a second coating is formed on top of the first one, those defects would in any event be inaccessible to any such surfacing treatment.

Figure 5:
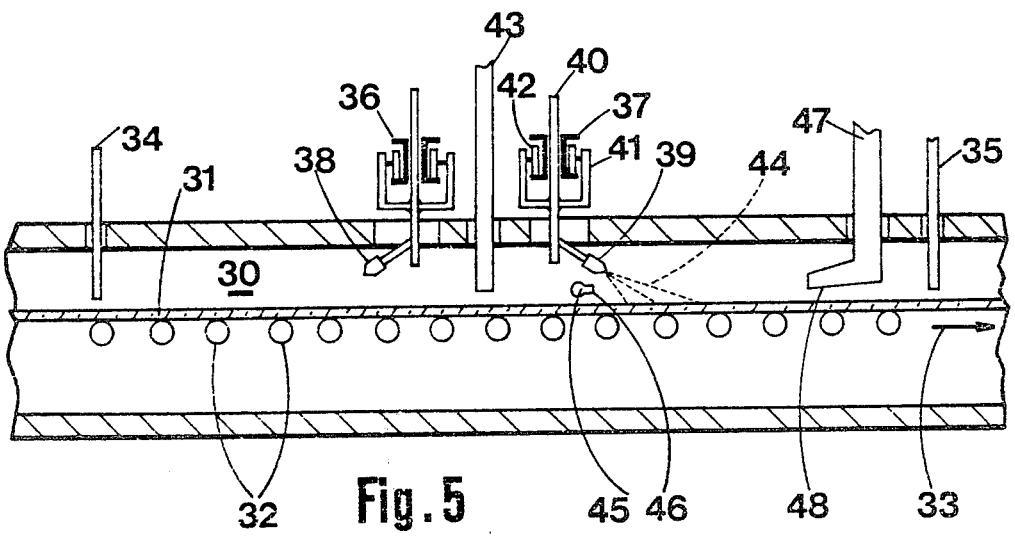
FIG. 5 shows part of another plant incorporating another embodiment of coating apparatus according to the invention.

Reference is now made to the apparatus shown in FIG. 5.

This figure shows part of a tunnel 30 through which a freshly formed glass ribbon 31, supported on rollers 32, travels from a flat glass forming plant, for example a float tank, in the forward or downstream direction indicated by arrow 33. The glass ribbon is coated during its travel through the tunnel by coating apparatus located in a compartment above the ribbon path, having upstream and downstream boundary screens 34, 35.

The coating apparatus comprises a plurality of spray guns arranged in spaced relation on an endless track having two parallel reaches 36, 37 which extend transversely across the tunnel at upstream and downstream coating stations. Two of the spray guns, designated 38 and 39, appear in the drawing, spray gun 38 being on the upstream reach and spray gun 39 being on the downstream reach of the endless track. Each spray gun is carried by a tube such as 40 within which there are passageways for the supply of coating solution and compressed air to the spray gun. Each such tube is supported by a carriage such as 41 having wheels such as 42 which run on the endless track. A partition 43 is disposed across the upper part of the tunnel between the parallel paths followed by the spray gun on the opposed reaches of the endless track.

During the coating process the series of spray guns is continuously rotated in one direction. The spray guns communicate during such rotation with coating solution and compressed air supply manifolds with facility for varying the supply distribution to suit different coating requirements. For example each of the spray guns can be in continuous communication with the coating solution and compressed air supply sources during each traverse of the spray gun across the tunnel. In these circumstances two superimposed coatings are formed on the glass ribbon. The first coating is formed from coating solution sprayed from spray guns as they traverse the tunnel on the upstream reach of the endless track. During that traverse the guns point downwardly and rearwardly, like spray gun 38. The top coating is formed from coating solution sprayed from spray guns as they traverse the tunnel on the downstream reach of the track, such guns pointing downwardly and forwardly like spray gun 39.

The coating solution supply system can be arranged so that only some of the spray guns are supplied with coating solution during their traverse on the upstream reach of the track and only the other guns are supplied with coating solution during their traverse on the downstream reach of the track. Different coating solutions can be supplied to the different sets of guns so that the superimposed coatings are of different compositions.

In the illustrated arrangement, coating solution is only sprayed at the downstream coating station, as represented by the droplet stream 44 from spray gun 39. The coating solution can be supplied to every gun of the series during its traverse of the tunnel at the downstream coating station or the coating solution can be supplied to only some of the guns of the complete series, depending on the required rate of deposition of coating material.

Behind the transverse path of the droplet streams at the downstream coating station there is a gas delivery conduit 45 which extends transversely across the tunnel above the path of the glass ribbon and has a delivery mouth 46 defining a slot-like discharge orifice which extends over the full width of the ribbon path. The conduit 45 is connected to a gas supply system (not shown) for continuously supplying air to that conduit so that a flat jet of the pre-heated air discharges forwardly from the said slot-like discharge orifice. This air jet impinges against the bottom portions of the sprayed streams of droplets as they travel across the tunnel at the downstream coating station. The jet has the effect of reducing the incidence of coating defects at the coating/substrate interface, presumably because the jet intercepts one or more potentially harmful substances which tend(s) to be entrained downwardly in vapour currents behind the spray cones, or because the jet dilutes the concentration of such substance(s) before it or they reach the glass substrate.

Because the jet of air from conduit 45 acts over the full width of the path of the glass ribbon, an appreciable amount of the air constituting that jet at any given moment travels across the transverse path of movement of the droplet streams out of line with such streams. This air can have the effect of scavenging vapours from the said transverse path so that they do not become entrapped in such streams. The process therefore also incorporates the invention described and claimed in co-pending Patent Application Ser. No. 228,232 entitled "Process and apparatus for coating glass", filed on the same date as this application and claiming priority from United Kingdom Patent Application No. 80.03 382.

The air supplied to the conduit 45 can be at ordinary temperature, for example 25° C. However, because there is a continuous discharge of the air over the full width of the ribbon path and the volume flow rate of the air is therefore substantially greater than is usual when using apparatus as shown in FIGS. 3 and 4, it is preferable to pre-heat the air. The pre-heat temperature can be selected to influence the temperature of the sprayed droplets as described and claimed in co-pending Patent Application Ser. No. 228,235 entitled "Process and apparatus for coating glass", filed on the same date as this application and claiming priority from United Kingdom Patent Application No. 80 03 357.

Downstream from the downstream coating station there is an exhaust duct 47 whose lower exhaust gas entry portion 48 is directed towards the said coating station. Means (not shown) is provided for continuously maintaining suction forces in the said duct to cause environmental gases in the vicinity of the front of the transverse path of the droplet streams at the downstream coating station to flow forwardly away from that path and into the exhaust duct, thereby reducing risk of deposition of material onto the formed coating from within the environment above the path of the glass ribbon.

The following are examples of processes according to the invention performed with the aid of apparatus as above described.

EXAMPLE 1

Coating apparatus as described with reference to FIGS. 3 and 4 was employed for coating a ribbon of glass 3 meters in width in course of its production by a Libbey-Owens type drawing process, the speed of the glass ribbon being of the order of 1 meter per minute. The coating apparatus was installed at a position such that the temperature of the glass at a zone of impingement of the droplet stream was of the order of 600° C.

The spray gun was of a conventional type, and was operated at a pressure of the order of 4 kg/cm$^2$. The gun was displaced to and fro across the ribbon path at a height of 30 cm above the glass ribbon, so as to complete nine reciprocations per minute. The spray gun was directed so that the axis of the spray was at 35° to the plane of the glass ribbon.

The spray gun was fed with an aqueous solution of tin chloride obtained by dissolving hydrated tin chloride ($SnCl_2.2H_2O$) in water in an amount of 375 g of the tin chloride per liter and adding per liter 55 g of $NH_4HF_2$.

The rate of delivery of the coating solution was adjusted to form on the glass ribbon a coating of tin oxide doped by fluorine ions and having a thickness of 7,500 A.

A jet of compressed air was continuously discharged at a rate of 15 m$^3$/hour from the nozzle 22 whose orifice was 20 cm above the glass ribbon. The nozzle was adjusted to lie at an inclination of 45° to the ribbon plane and to project the air jet against the glass ribbon, immediately behind the zone of impingement of the droplet spray on the ribbon.

The air exhaust system was adjusted to maintain a depression of the order of 100 mm of water in the suction nozzle of each of the exhaust ducts 11 and 13, which nozzles were 20 cm above the glass ribbon.

The coated glass resulting from the process was found to be of very high optical quality, with only a very minor amount of light-diffusing defects internally of the coating or at the coating/glass interface.

A coating of indium oxide can be formed from an aqueous solution of the indium nitrate with similarly good results.

A process as above described can also be used for example for coating a ribbon of glass as it travels from a float tank.

In a comparative test, the process was performed without discharging gas from the nozzle 22 but under otherwise unchanged conditions. The resulting coated glass was found to have light-diffusing areas distributed in a pattern similar to that depicted in FIG. 2.

EXAMPLE 2

Apparatus as described with reference to FIGS. 3 and 4 was employed for coating a ribbon of glass having at the impingement zone of the droplets a temperature of the order of 580° C. The spray gun was supplied with a solution of the reaction product of anhydrous $SnCl_4$ with methanol. The concentration of the solution was adjusted by means of dimethylformamide after addition of HCl for stabilising the solution, and $NH_4HF_2$ as doping agent.

The delivery of the coating solution was regulated so that a coating of $SnO_2$ doped by fluorine ions and having a thickness of 7,200 A was formed on the glass ribbon.

Suction forces were maintained continuously in the ducts 11 and 13, as in Example 1.

A jet of compressed air was discharged continuously from nozzle 22 during each traversal of the spray gun across the glass ribbon. The jet was directed against the bottom portion of the droplet stream, that is in the immediate vicinity of the substrate. The delivery rate of the air was sufficient to cause slight deformation of the natural shape of such stream.

The coating was of high quality, with little evidence of interfacial defects giving rise to light diffusion at the glass/coating interface.

In a modification of the foregoing process, in which substantially identical results were obtained, the coating solution therein used was substituted by a solution obtained by reacting $SnCl_4$ with acetic anhydride in stoichiometric proportions, slowly agitating the resulting very syrupy brown-black liquid to allow escape of HCl, diluting the mixture with dimethylformamide and adding some cubic centimetres of a 40% by volume commercial solution of HF as doping agent.

In further tests, the process according to Example 2 was repeated with the modification in one case that the nozzle 22 was directed at a downward inclination with its axis in line with the line of intersection between the rear boundary of the spray cone and the glass ribbon, and in the other case that the nozzle 22 was directed horizontally like the jet from conduit 45 in FIG. 5. The coating quality achieved was as high as when using the inclined nozzle position shown in FIG. 3, as in Example 2.

EXAMPLE 3

A ribbon of float glass having a width of about 2.5 meters was coated as it travelled from the float tank, at a speed of 4.5 meters per minute, using a coating apparatus as represented in FIGS. 3 and 4. The spray gun 20 was set at 30° to the horizontal and the air nozzle 22 was set at an angle of 27° to the horizontal and so as to point directly at the bottom portion of the spray, adjacent to the glass ribbon.

The spray gun was of conventional type and was operated under a pressure of the order of 3 kg/cm$^2$. The gun was mounted 25 cm above the glass ribbon and was pointed at an inclination of 30° to the ribbon plne. The gun was reciprocated at 10 cycles per minute. The gun was fed with a solution obtained by dissolving cobalt acetylacetonate $Co(C_5H_7O_2)2H_2O$ in dimethylformamide. The gun was located so that this solution impinged on the glass ribbon at a position along its path where the glass had a temperature of the order of 580° C.

The suction nozzle 12 of the exhaust duct 11 was located 20 cm above the glass ribbon. The suction forces were adjusted so that a depression of the order of 50 mm of water was maintained in the said suction nozzle. The exhaust duct 13 was not employed.

The rate of discharge of the coating solution was adjusted so that a coating of cobalt oxide ($Co_3O_4$) having a thickness of the order of 920 A formed on the glass.

A jet of compressed air was discharged continuously from nozzle 22 which was located at a height of 15 cm above the glass ribbon. The volume rate of discharge of the air was set so that the jet acted directly against the droplet stream but the jet was not of sufficient strength to cause deformation of the shape of the spray cone. The use of a jet which was relatively weak in comparison with that employed in the earlier examples was decided on because of the very volatile nature of the coating solution.

The coating formed on the glass ribbon had a brownish tint viewed in transmission and there was little trace of haze originating internally of the coating or at the glass/coating interface.

The foregoing coating procedure can be followed for forming coloured layers composed of a mixture of oxides by feeding the spray gun with a solution containing a mixture of compounds of different metals e.g. compounds of metals selected from the group iron, cobalt, chromium and nickel, or by making use of a plurality of spray guns and feeding different solutions simultaneously through different guns.

We claim:

1. In a process for forming a metal or metal compound coating on a face of a heated glass substrate during its displacement in a given direction, constituting the forward direction of displacement, through a coating station by contacting the substrate with at least one stream of droplets composed of at least one substance from which said coating metal or metal compound is formed on said face, the improvement wherein said stream is inclined downwardly and parallel to the given direction towards the substrate and comprising discharging at least one jet of gas into the environment above the substrate so that it travels in the same direction parallel to the given direction as said stream above the substrate and impinges against said droplet stream.

2. A process according to claim 1, characterised in that the droplet stream is inclined downwardly and in the forward direction towards the substrate.

3. A process according to claim 1, characterised in that at least one said stream of droplets impinges on a zone within the substrate face area to be coated and comprising repeatedly displacing such stream transversely across the path of the substrate.

4. A process according to claim 3, characterised in that said droplet stream is displaced to and fro transversely across the substrate path.

5. A process according to claim 3, characterised in that said droplet stream discharges from at least one spray head which is displaced along an endless course so as repeatedly to tranverse the substrate path in one direction at the coating station.

6. A process according to claims 4 or 5, characterised in that said step of discharging at least one gas jet is effected from at least one orifice which is displaced transversely across the path of the substrate simultaneously with the droplet stream.

7. A process according to claim 1, 2 or 3, characterised in that said step of discharging at least one gas jet is effected from a plurality of stationary orifices distributed transversely across the path of the substrate.

8. A process according to claim 1, 2 or 3, characterised in that the gas forming said jet is blown into the environment above the substrate from an extraneous source.

9. A process according to claim 1, 2 or 3, characterised in that the volume flow rate of the gas forming said jet is such as to cause slight deformation of the cross-section of the droplet stream.

10. A process according to claim 1, 2 or 3, characterised in that the width of the at least one jet is at least sufficient to ensure impingement thereof against the full width of the at least one droplet stream.

11. A process according to claim 1, 2 or 3, characterised in that the gas jet is of elongate cross-section, the longer cross-sectional dimension being in the direction transverse to the path of the substrate.

12. A process according to claim 1, 2 or 3, characterised in that there is at least one said gas jet which laterally diverages from its discharge orifice.

13. A process according to claim 1, 2 or 3, characterised in that said gas jet is directed so as to act against the bottom part of a said droplet stream, adjacent the glass substrate.

14. A process according to claim 1, 2 or 3, characterised in that said gas jet is inclined downwardly from at least one discharge orifice.

15. A process according to claim 14, characterised in that said inclined jet is directed so as to be deflected against the lower portion of a said droplet stream from the glass substrate.

16. A process according to claim 1, 2 or 3, charcterised in that said droplet stream is inclined so that the included angle between the axis of the droplet stream and the substrate face being coated is in the range of 20° to 60°.

17. A process according to claim 16, characterised in that said stream of droplets is a parallel stream or diverges from its source at an angle of not more than 30°.

18. A process according to claim 1, 2 or 3 characterised in that the said droplet stream is discharged from a source which is at a perpendicular distance of from 15 to 35 cm above the substrate face being coated.

19. A process according to claim 1, 2 or 3, characterised in that the substrate is a continuous ribbon of flat glass travelling from a flat glass forming plant.

20. A process according to claim 19, characterised in that said forming plant is a float tank.

21. A process according to claim 20, characterised in that said droplet stream impinges on the top face of the ribbon at a position where the temperature of the glass is within the range 650° to 100° C.

22. A process according to claim 1, 2 or 3, characterised in that the droplets are droplets of a solution of a metal salt from which a metal oxide coating forms on said substrate face.

23. A process according to claim 22, characterised in that said solution is a tin chloride solution.

24. A process according to claim 1, 2 or 3, characterised in that a gas exhaust system is operated for drawing environmental gases away from the droplet stream in the same direction over the substrate as that in which the gas jet is directed.

25. A process according to claim 1, 2 or 3, characterised in that said step of discharging at least one gas is effected from a stationary orifice.

* * * * *